Nov. 3, 1964 W. V. SPURLIN ETAL 3,155,853

ALUMINUM LEAF SPRING SPACER

Filed Dec. 30, 1960 3 Sheets-Sheet 1

INVENTORS
WILLIAM V. SPURLIN &
BYRON E. WEST
BY William D. Carothers
THEIR ATTORNEY

ALUMINUM LEAF SPRING SPACER

INVENTORS
WILLIAM V. SPURLIN &
BYRON E. WEST
BY
William D. Carothers
THEIR ATTORNEY ALUMINUM LEAF SPRING SPACER
Filed Dec. 30, 1960 3 Sheets-Sheet 3
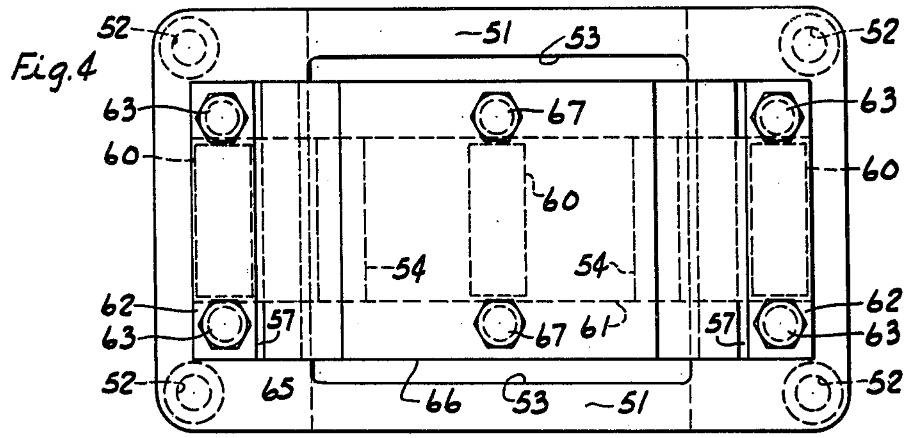
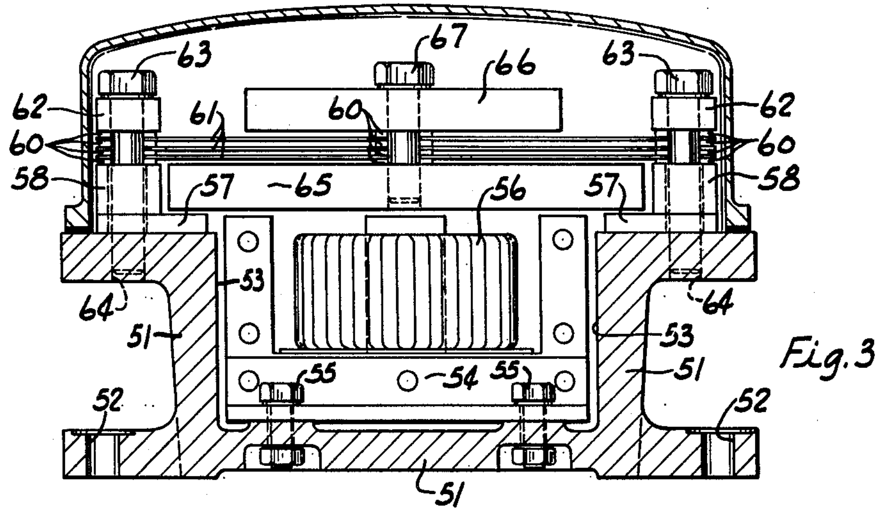
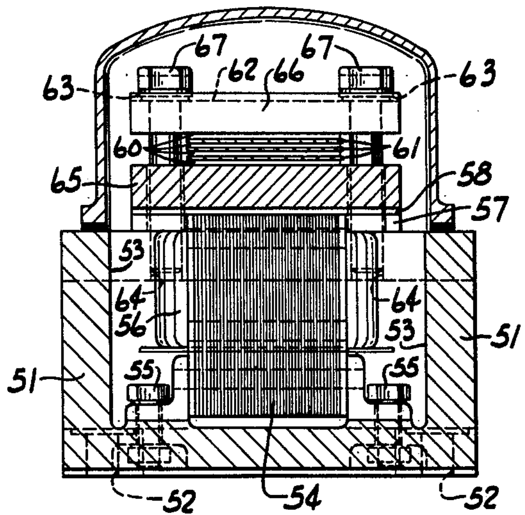
INVENTORS
WILLIAM V. SPURLIN &
BYRON E. WEST
BY William D. Carothers
THEIR ATTORNEY 3,155,853

ALUMINUM LEAF SPRING SPACER

William V. Spurlin and Byron E. West, Indiana, Pa., assignors, by mesne assignments, to Link-Belt Company, Chicago, Ill., a corporation of Illinois Filed Dec. 30, 1960, Ser. No. 79,720
10 Claims. (Cl. 310—29)

This invention relates generally to the mounting of leaf springs for vibratory equipment and more particularly to the spacers mounted between the clamped end of the leaf springs in a vibratory system.

The problem of clamping the leaf springs in a vibratory system has been a source of concern since the inception of such vibratory structures. This is particularly true of the fixed end spring system as compared with the free end or cantilever spring system.

Heretofore wide steel spacers have been employed at the clamping points between steel leaf springs which spacers were approximately one-tenth the thickness of the spring itself. These operate successfully for some time but with several limitations. The surface of the leaf spring on the deflecting side along the edge of the spacer is affected by what is known as fretting corrosion. Fretting results in a line or notch that tends to promote start of fracture. These steel spacers rigidly grip the ends of the springs and the whole of the flexure of the spring is confined wholly within the spring itself which must stretch to flex between its clamped ends.

The present invention overcomes these difficulties providing a spacer that has a modulus of elasticity that permits its deformation, within its elastic limit, which permits movement of the spring without any sliding action as is the case of a free end beam. A low modulus material such as aluminum, copper or a strong thermosetting resin may be employed. It has been discovered that hardened aluminum which has been heat treated to give it higher tensile strength and hardness is successful in permitting the spring to move within the elastic limit of the hardened aluminum but without relative movement between the surfaces of the spacer and spring.

The operation of the free end beam supported by having its ends resting on fulcrums which permit the beam to slide over the fulcrums, thus avoiding fatigue failure at the clamped edge, due to the high stresses inherent at this point in a clamped end beam. To approach this condition the spacers comprising this invention have been made materially narrower than the steel spacers. Although this approaches the free end supported beam it is of course not the same since the hard aluminum spacers must be of sufficient width to support the clamping pressure without deformation laterally due to said clamping pressure. Thus the aluminum spacers deform in the direction of spring elongation within the elastic limits of the aluminum spacer itself, when the spring flexes. Since aluminum has a low modulus of elasticity the spacers change the loading on the spring from a fixed beam to that approaching a free end beam.

It has been discovered that this new spring action allows the use of a thicker leaf spring than that used with old steel spacers. Since the steel leaf spring is thicker the number of leaf springs required is less. This reduces the number of pounds of steel required for the same motor performance which is a considerable advancement.

The reduction in the number of springs with their increased thickness permits the use of larger spacers and provides a greater amplitude of the thicker springs. All of this comes about through the use of thicker spacers that may be worked by the springs within its elastic limit. By making the spacer deform, the spring is not confined to lineal clamping and it ceases to have fretting corrosion along the edge of the clamping margins.

By the use of less springs for the same vibratory motor there is a decrease in the number of bending lines between springs and spacers resulting in a reduction of spring friction losses.

This invention not only permits the use of thicker springs but these springs can provide a greater amplitude than that provided by the steel spring spacers with the thinner leaf springs. These hard aluminum spacers also maintain greater stability of the vibratory motors without spring failure.

With the steel spacers and the thinner leaf springs, the springs were more than ten times as thick as the spacers, but with this invention the thicker leaf springs are only about four times as thick as the spacers. The relatively thicker aluminum spacers allow axial deformation of the spacer within its elastic limit which in turn reduces the bending stress in the springs.

The spacers of low modulus material which are one-fourth or greater than the thickness of the spring and have sufficient area to withstand the clamping forces without exceeding the elastic limit of the spacer material when subjected to the vibratory action of the spring will work within the elastic limit of the spacer material to effect slight movement of the spring fulcrum simulating a flexed free spring beam resting on a fulcrum. This prevents fretting and extends the spring life indefinitely.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a view in side elevation of the motor shown in FIG. 2 as applied to a trough conveyor.

FIG. 3 is a view in elevation of a heavy duty vibrator embodying this invention.

FIG. 4 is a plan view of the vibrator shown in FIG. 3.

FIG. 5 is a view in vertical section of the structure shown in FIGS. 3 and 4.

Figure 1:
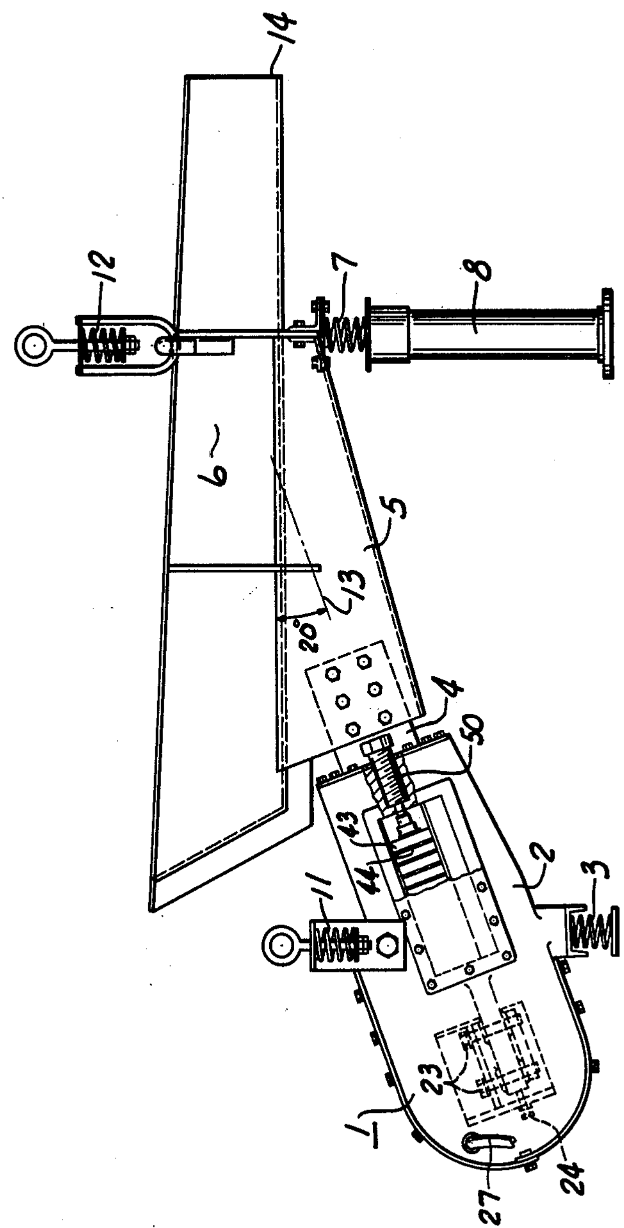

Referring to FIG. 1 of the drawings the vibratory motor employing this is shown at 1 and is supported from the underside of its base 2 by the spring member 3 and its armature is connected by the armature frame casting 4 bolted to the trough bracket members 5 that are rigidily secured to the trough member 6. The trough member 6 may also be supported from the under side by the springs 7 mounted on top of the standard 8.

The motor is provided with a spring and hanger assembly 11 and the trough is supported by the spring and hanger assembly 12 if this vibratory conveyor is to be suspended.

When the motor is energized it reciprocates the armature casting 4 along the construction line 13 which is approximately 20° from the base of the trough 6 and which reciprocation will feed material dropped into the trough to its open end as indicated at 14.

Figure 2:
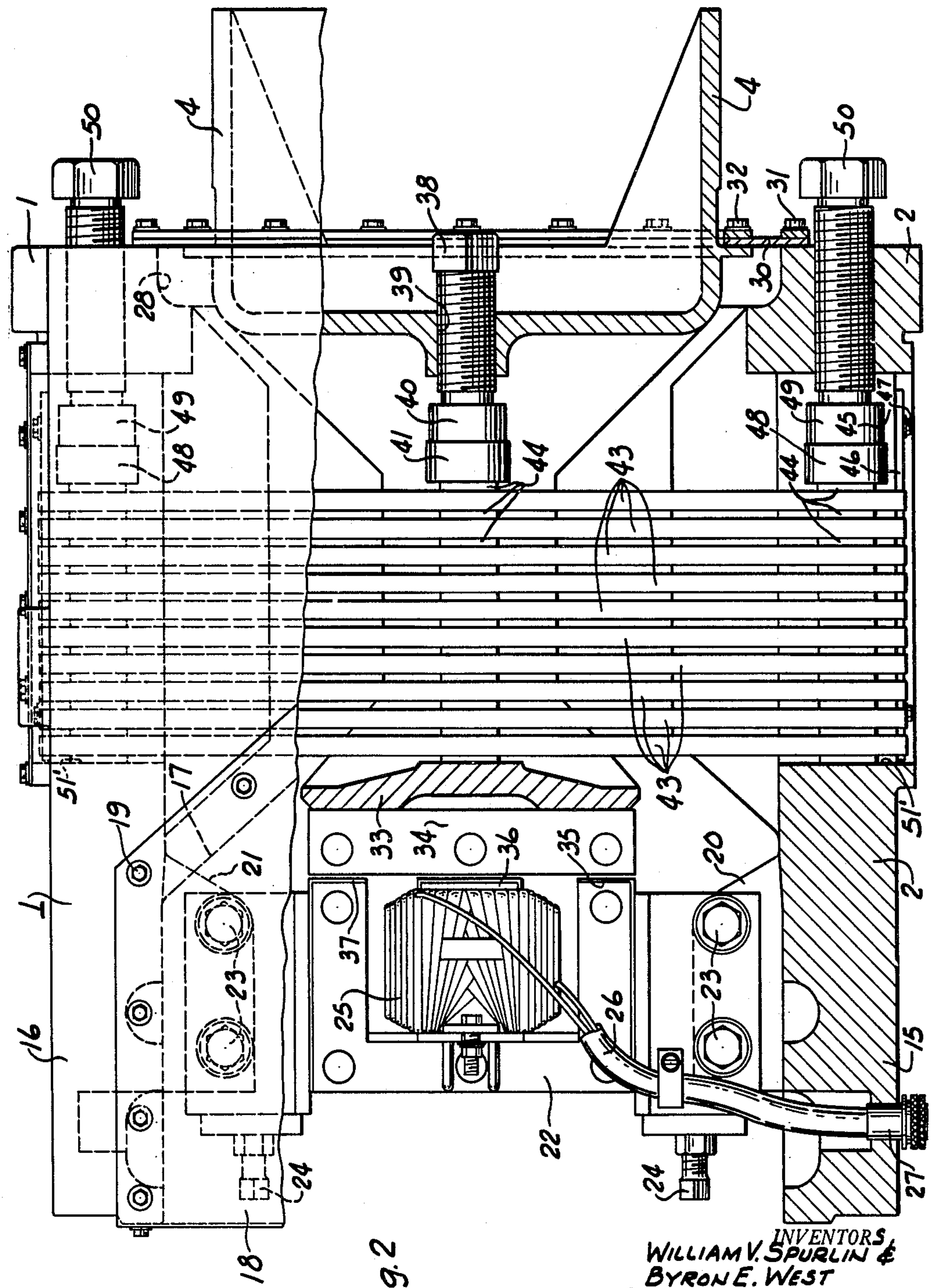
FIG. 2 is a plan view partly in section of a leaf spring motor comprising this invention.

Referring to FIG. 2, the motor 1 with its base casting 2 is provided with the heavy spaced rearwardly projecting walls 15 and 16 that are open at the top and the bottom along the marginal edge indicated at 17 which is enclosed by the cover member 18 bolted thereto by the bolt members 19. When the cover is removed the space between the rearward projections 15 and 16 is entirely open and exposes the flange members 20 and 21 to which the core member 22 is bolted by the bolts 23 for the purpose of securing the core relative to the base member. By loosening the bolts 23 the core member 22 may be adjusted by the screws 24.

The core member is E-shaped as illustrated in FIG. 2 and the central projection has the magnetic coil 25 mounted thereon. The terminals of this coil are brought out through the cables 26 through the rearward projection 15 where it is connected with the exterior cable member 27.

The armature casting 4 extends through a front opening 28 of the base 2 which is enclosed by the diaphragm 30 bolted to the base by means of the bolts 31 and to the armature casting 4 by means of the bolts 32. This flexible diaphragm closes any opening and thus keeps dirt from the interior of the motor in the same manner as the cover 18.

The armature casting 4 has a stirrup member 33 which has mounted on its underside the armature 34 which is held in spaced operating position from the electromagnetic core 22, there being three pole faces as indicated at 35, 36 and 37 and the armature 34 being a straight bar preferably of laminated magnetizable material.

The stirrup 33 is connected on both sides to the opposite end of the armature casting 4 and the center of the latter is provided with a clamping means such as indicated by the screw member 38 received in a threaded opening 39 and having its inner end bared against the center spacing block member 40 which in turn rests upon the center clamping assembly block 41, the latter bearing against the outer face of the first aluminum spacer 44 in contact with the first of a series of leaf springs 43 there being shown ten in all, each of which is separated by the spacer member 44 that comprises this invention. The ends of the spring 43 extend through the windows 45 and are engaged by the aligning bars 46 which are bolted to the base casting 2 by means of the bolts 47. Each of the springs 43 is also provided with spacer blocks 44 the first spring being provided with blocks on both sides. One is engaged by the end spacer blocks 48 which in turn is backed by the second end spacer block 49 that is engaged by the end clamping screw members 50 that pass through threaded openings on casting 2. The bolts compressing each of the spacers 44 between each of the leaf springs 43 and against inner seat 51' of the window 45.

In order to facilitate the mounting of the spacers 44 on the leaf springs 43 one side of each leaf spring has cemented thereto three spacers, one for the central or armature clamping assembly and the outer blocks for each of the end clamping assemblies. The last spring 43 is provided with two spacers on its other face for use as shown under the end spacer blocks 48, and one spacer block in the center in contact with the center clamping block 41.

These spacers 44 have a length which is equal to the width of the springs 43 when the spacers are positioned transversely of the springs, however, the width of each spacer is materially less than the widths of the center and end clamping blocks 41 and 48 and are of such size and thickness as to be at least one-fourth the thickness of the spring member 43 if not thicker in some applications. The available compressive strength of all of the spacers is 1.7 to 2.6 times the applied load of the compression by the screws 38 and 50.

These spacers are preferably made of a hardened aluminum alloy which has been heat treated to provide high tensile strength to give it hardness. Such an aluminum is known as 6061–T6 having a Brinell hardness of 95 under a 500 kilogram load with a ball size of 19 millimeters.

The compressive stress of this hard aluminum spacer cannot exceed its yield point and thus it has to have an area of sufficient size to prevent crushing. It is of course desirable to make the spacers 44 as narrow as possible but they must have a sufficient area to avoid being crushed or deformed beyond the elastic limit of the hardened aluminum. Thus these spacers 44 cannot be too narrow or they would be exceeded by the strength of the tightening of the clamping bolts. Vibratory feeders of the character described are preferably made to feed material at forty-five feet per minute by the deflection of approximately .032 of an inch from the center or a natural position of the spring. The trough movement is twice this deflection or .065. The stress of the spring is thus the limiting factor because it is desirable to maintain this feeding rate and the deflection is determined by the length together with the thickness of the leaf spring which also determines the thickness of the spacers 44.

By using spacers one-quarter of the thickness of the leaf springs and of the hardness previously mentioned it was discovered that leaf springs of a greater thickness could be employed for the same job, which thicker leaf springs would provide a greater magnitude of deflection and of course a less number of such leaf springs are required for the same job. These spacers may also be as great as four-tenths of the thickness of the leaf springs for feeder motors of this character.

With this thickness of spacer a clamp between each of the leaf springs and between the leaf springs and their spacer clamping blocks a leaf spring ceased to show any fretting and corrosion and the leaf springs themselves have not been found to break. The fretting corrosion on the flexing side of the leaf spring adjacent the marginal edge of the old spacers made of steel and of from .030 to .040 of an inch thick would result in formation of a line or notch which brought about failure of the spring.

By employing a hardened aluminum spacer which has sufficient area to withstand a crushing effect of the clamping screws and holds the leaf springs with sufficient tightness allows these leaf springs to have an increased latitude in movement which they do not have when the thin steel spacers are employed. This movement is due to the deformation of the hard aluminum spacer within its elastic limit. This deformation permits movement of the spring without relative movement between the spacers and the springs. Thus the relatively thick hard aluminum spacer permits improvement in a vibratory feeder of this character, providing an increased feeding rate of some installations as much as one-third.

Referring to FIGS. 3, 4 and 5 the vibrator shown is provided with a base 51 which may be bolted to the device to be vibrated passing bolts through the bolt holes 52. The base 51 is a hollowed casting having a chamber 53 open at the top. The chamber 53 has the E-shaped core 54 secured in the bottom thereof by the bolts 55 and its center leg is provided with electromagnetic coil 56. The base casting 51 is longer than it is wide and its ends are provided with a block pad 57 on which is mounted a bridge block 58 for the purpose of receiving four aluminum spacers 60 on each side of the three leaf springs 61. The top spacer block 62 is mounted over the uppermost hard aluminum spacer and the whole assembly is bolted down by the bolts 63 which extend into threaded openings 64 to the base casting 51.

The center of the leaf springs are provided with the same number of spacers 60 which are clamped between the armature member 65 and the transverse armature frame 66 by the bolts 67 which bolt this assembly to the mid-position of the springs. It would be noted from FIGS. 4 and 5 that the springs 61 are not as wide as the armature 65 and the bridge member 66.

In this particular vibrator the spring thickness is one-thirty-second of an inch thick, however, the hard aluminum spacers are one-sixteenth of an inch thick or twice the thickness of the spring. This particular vibrator could of course be provided with thicker springs if it was desired to have a structure the natural period of vibration of which would be different than that of the structure shown.

Materials such as rubber and fiber were employed as spacers but found to be entirely unsatisfactory as the rubber will vary the operation of the feeder under temperature changes. Thus one could not depend upon the feeding action being consistent under different ambient temperatures. Again the rubber is continuously changing in flexibility as the older it gets the harder it gets as it is known to have the property of polymerizing with age. Fiber was also employed as a spacer, however, such material does not have a very high compressive strength and it would yield under the constant pressure of the clamping screws causing a change in the natural frequency of the feeder. It was discovered that the thick hard aluminum spacers having a width just sufficient to overcome the compressive forces of the clamping screw and still retain the spacer within the elastic limit of the hard aluminum spacer permitting the leaf spring to function as a flexible member approaching the conditions of a free end beam. When the aluminum spacers are made sufficiently large to withstand the compressive strength of the clamping screws they are still materially smaller in width than the steel spacers formerly employed.

We claim:

1. A vibratory motor comprising a base having spaced seats, leaf springs having their ends seated on said seats, a plate spaced of low modulus hard and solid material mounted between the leaf springs and said seats and between adjacent leaf springs, clamp means to secure said plate spacers and leaf springs on said seats in said base, an armature frame having a seat to receive the center of said leaf springs, a plate spacer of low modulus material on said armature frame seat and between adjacent leaf springs, second clamp means to secure said leaf springs and said plate spacers to said armature frame, an armature carried by said armature frame, an electromagnetic field mounted on said base in operative position relative to said armature to reciprocate the same for transmitting vibrations to a member to be vibrated, hard aluminum spacers separating said springs to form a spring clamping assembly at said spring clamping seat, said spacers being at least one-fourth the thickness of said springs.

2. A spring mounting for vibratory motors having a base mounted field means and an armature means, spaced seats on said base, leaf springs having their ends seated on said seats and plate spacers mounted between said leaf springs and said seats and between adjacent leaf springs, said plate spacers being of low modulus material and having sufficient area to withstand the clamping forces without exceeding the elastic limit of the spacer material when subjected to the vibratory action of the springs, each plate spacer having a thickness of at least one-fourth the thickness of a leaf spring.

3. A spring mounting for vibratory motors having a base mounted field means and an armature means, spaced seats on said base, leaf springs having their ends seated on said seats and plate spacers mounted between said leaf springs and said seats and between adjacent leaf springs, said plate spacers being of low modulus material and having sufficient area to withstand the clamping forces without exceeding the elastic limit of the spacer material when subjected to the vibratory action of the springs, said plate spacers are aluminum.

4. A spring mounting for vibratory motors having a base mounted field means and an armature means, spaced seats on said base, leaf springs having their ends seated on said seats and plate spacers mounted between said leaf springs and said seats and between adjacent leaf springs, said plate spacers being of low modulus material and having sufficient area to withstand the clamping forces without exceeding the elastic limit of the spacer material when subjected to the vibratory action of the springs, said plate spacers are copper.

5. A spring mounting for vibrataory motors having a base mounted field means and an armature means, spaced seats on said base, leaf springs having their ends seated on said seats and plate spacers mounted between said leaf springs and said seats and between adjacent leaf springs, said plate spacers being of low modulus material and having sufficient area to withstand the clamping forces without exceeding the elastic limit of the spacer material when subjected to the vibratory action of the springs, said plate spacers are a thermosetting resin.

6. A vibratory motor comprising a base and frame having spaced seats, an armature carried by said frame, an electromagnetic field mounted on said base, leaf springs having their ends seated on said seats to support said frame for vibratory reciprocation, a hard and solid plate spacer of low modulus material mounted between said seats and said leaf springs and between adjacent leaf springs, clamp means to secure said plate spacers and leaf springs on said seats of said base and frame to support said armature in operative spaced relation with said field to reciprocate the same for transmitting vibrations to said frame for the purpose of vibrating a member, said plate spacers being of a length to extend transversely across the width of the springs and having a width to provide a spacer area sufficient to withstand the clamping forces of said clamp means and flex within their elastic limit without exceeding the elastic limit of the spacer material when subjected to the vibratory action of the springs.

7. A spring mounting for vibratory motors having an armature means and a field means and comprising a base and a frame, seats on said base and frame, said field means and armature means mounted on said base and frame, a leaf spring mounted on said seats, a hard aluminum plate spacer placed on each side of said leaf spring, clamp means to secure said leaf spring between said aluminum plate spacers and on said seats to support said frame for vibration and said armature means in operative spaced relation to said field means, said hard aluminum plate spacers having a sufficient clamping area between said spring and seats to withstand the operating vibratory forces and flex within their elastic limit without exceeding the elastic limit of the hard aluminum plate spacers when subjected to the vibratory action of the spring.

8. A vibratory motor comprising a base and a frame, seats on said base and frame, leaf springs having their ends seated on said seats, a plate spacer of low modulus hard and solid material mounted between said seats and said leaf springs and between adjacent leaf springs, clamp means to secure said plate spacers and leaf springs on said seats, an armature carried by said frame and an electromagnetic field carried by said base, said springs supporting said armature in operative spaced relation relative to said electromagnetic field to reciprocate said frame for transmitting vibrations to a member to be vibrated, said plate spacers being as long as the width of said springs to extend transversely across the width of the springs, said plate spacers having a width sufficient to produce a clamping spacer area that will withstand the operating vibratory forces and flex within their elastic limit without exceeding the elastic limit of the spacer material when subjected to the vibratory action of the springs, and said spacers being at least one-fourth the thickness of the springs.

9. A spring mounting for vibratory motors having a base and a frame, a base mounted field means and a frame mounted armature means, spaced seats on said base and frame, leaf springs having their ends mounted and clamped on seats on said base and frame, plate spacers mounted between said seats and said leaf springs and between adjacent leaf springs, said plate spacers being of a hard and solid material of low modulus of elasticity and having sufficient clamping area to withstand the clamping forces and flex within their elastic limit without exceeding the elastic limit of the spacer material when subjected to the vibratory action of said springs when said frame is reciprocated by said field means operating on said armature means.

10. A vibratory motor comprising a base having spaced seats, leaf springs having at least one of their ends seated on said seats, a frame to be secured to a member to be vibrated and having at least one seat to receive portions of said leaf springs, clamp means to secure said leaf springs on said seats of said base and said frame, a plate spacer of low modulus hard and solid material mounted between said leaf springs and said seats on said base and on said frame and between said leaf springs and said clamp means and between adjacent leaf springs, the area of each of said plate spacers subjected to the clamping pressure being sufficient to withstand the clamping forces of said clamp means without exceeding the elastic limit of the low modulus spacer material when subjected to the vibratory action of the leaf springs, and motor vibratory means secured to said frame to transmit vibrations directly thereto and reciprocate the member to be vibrated.

References Cited in the file of this patent

UNITED STATES PATENTS

| | | |
|---|---|---|
| 1,900,841 | Nilsson | Mar. 7, 1933 |
| 1,934,978 | Held | Nov. 14, 1933 |
| 2,155,073 | Ziska | Apr. 18, 1939 |
| 2,439,219 | O'Connor | Apr. 6, 1948 |
| 2,864,435 | Flint | Dec. 16, 1958 |
| 2,864,436 | Kime | Dec. 16, 1958 |
| 2,895,064 | Hoff | July 14, 1959 |
| 2,930,915 | Reutter | Mar. 29, 1960 |